(No Model.)

H. W. FISHEL.
BOUTONNIÈRE.

No. 502,854. Patented Aug. 8, 1893.

Witnesses:—
D. H. Hayward
William M. Iliff

Inventor:—
Henry W. Fishel.
By his attorney
Edwin H. Brown

UNITED STATES PATENT OFFICE.

HENRY W. FISHEL, OF NEW YORK, N. Y.

BOUTONNIÈRE.

SPECIFICATION forming part of Letters Patent No. 502,854, dated August 8, 1893.

Application filed May 26, 1893. Serial No. 475,584. (No specimens.)

*To all whom it may concern:*

Be it known that I, HENRY W. FISHEL, of New York, in the county and State of New York, have invented a certain new and useful Improvement in Boutonnières, of which the following is a specification.

I will describe a boutonnière embodying my improvement and then point out the novel features in claims.

Figure 1:
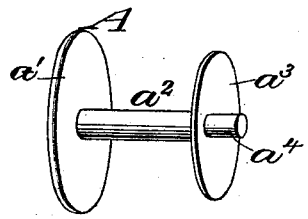
Figure 2:
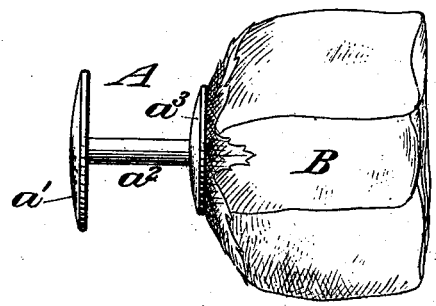
Figure 3:
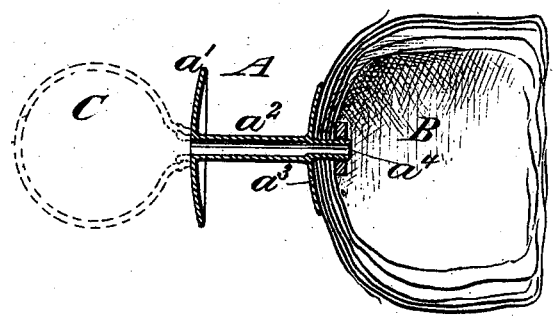

In the accompanying drawings, Figure 1 is a perspective view of a boutonnière stud embodying my improvement. Fig. 2 is a side view of the boutonnière complete. Fig. 3 is a sectional side view illustrating a modification.

Similar letters of reference designate corresponding parts in all the figures.

A designates a stud which may be made of any suitable material, as, for example, metal, wood or celluloid. It comprises a back plate or shoe $a'$, a stem or post $a^2$, a flange or socket $a^3$ and a nipple $a^4$, all these parts being made in one integral structure. This stud is intended to be slipped into a button hole. To its nipple is fastened an artificial flower B. This may be secured against the flange or socket $a^3$ by passing the nipple $a^4$ through the leaves or petals and then producing a lateral projection inside of the flower. This lateral projection may be produced by upsetting or bending the nipple in any suitable manner. For instance, the end portion of the nipple may be split and the bifurcate portions may be bent laterally. If preferred, the nipple may be screwthreaded and a nut applied to it inside of the flower, as illustrated in Fig. 3. Instead of a nut, a piece may be clinched onto the end of a plain or unscrewthreaded nipple; or the nipple may be upset, or riveted. If the stem and nipple are made hollow, a reservoir for perfume may be attached to the back of the stud, as indicated by the dotted lines C in Fig. 3. Perfume carried in this reservoir may be ejected through the stud.

By the term shoe, I wish to include any projection, as, for instance, a spiral.

What I claim as my invention, and desire to secure by Letters Patent, is—

1. The combination with a flower, of a stud made in one integral piece and having a stem or post, a back plate or shoe, a socket and a nipple made in one integral structure, the nipple being passed through the flower to fasten it to the stud, substantially as specified.

2. The combination with a flower, of a stud made in one integral piece and having a stem or post, a back plate or shoe, a socket and a nipple made in one integral structure, the nipple being passed through the flower and provided with a lateral projection inside the flower for fastening the flower to the stud, substantially as specified.

3. The combination with a flower, of a stud made in one integral piece and having a stem or post, a back plate or shoe, a socket and a nipple made in one integral structure, the nipple being passed through the flower and split at the end and bent laterally to fasten it to the stud, substantially as specified.

In testimony whereof I have signed my name to this specification in the presence of two subscribing witnesses.

HENRY W. FISHEL.

Witnesses:
ANTHONY GREF,
ROBT. A. KELLOND.